United States Patent [19]

Chakravorty

[11] Patent Number: 5,609,797
[45] Date of Patent: Mar. 11, 1997

[54] METHOD FOR RECORDING REFRACTIVE INDEX PATTERNS IN POLYIMIDE FILMS

[75] Inventor: Kishore K. Chakravorty, Issaquah, Wash.

[73] Assignee: The Boeing Company, Seattle, Wash.

[21] Appl. No.: 650,260

[22] Filed: May 21, 1996

Related U.S. Application Data

[63] Continuation of Ser. No. 56,453, May 3, 1993, abandoned.

[51] Int. Cl.$^6$ .................................................. G02F 1/00
[52] U.S. Cl. .................... 252/589; 252/582; 385/131; 385/132; 430/1
[58] Field of Search .................... 252/582, 589; 385/129, 130, 131, 132; 430/1

[56] References Cited

U.S. PATENT DOCUMENTS

| | | |
|---|---|---|
| 4,508,749 | 4/1985 | Brannon et al. . |
| 4,609,252 | 9/1986 | Wong et al. . |
| 4,712,854 | 12/1987 | Mikami et al. . |
| 4,756,734 | 7/1988 | Kersten et al. ............ 385/132 |
| 4,770,897 | 9/1988 | Wu . |
| 5,054,872 | 10/1991 | Fan et al. . |
| 5,108,201 | 4/1992 | Matsuura et al. . |
| 5,120,569 | 6/1992 | Zupancic . |
| 5,168,542 | 12/1992 | Chakravorty et al. ............ 385/132 |

OTHER PUBLICATIONS

Katayama, et al, "Polymer Optical Circuits For Multimode Optical Fiber Systems", *Applied Optics* vol. 19, No. 18, pp. 3124–3129. Sep. 15, 1980.

Krig, et al, "Optical Properties Of Strip-Loaded Polydiacetylene Waveguides", *SPIE*, vol. 1216, pp. 3124–3129. 1990.

Chandross, et al, "Latent-Imaging Photopolymer Systems", *Applied Optics*, vol. 17, No. 4, pp. 566–573. Feb. 15, 1978.

C. T. Sullivan, "Optical Waveguide Circuits For Printed Wire-Board Interconnections", *SPIE*, vol. 994, pp. 92–99. 1988.

Chien, et al, "Dependence Of Precursor Chemistry And Curing Conditions On Optical Loss Characteristics of Polyimide Waveguides" *SPIE*, vol. 1323, pp. 338–347. 1990.

Chakravorty, et al., "Waveguiding Characteristics In Polyimide Films With Different Chemistry of Formation", *SPIE*, vol. 1389, pp. 559–347. 1990.

Franke, et al., "Optical Waveguideing In Polyimide", *SPIE*, vol. 651, pp. 102–107. 1986.

Reuter, et al., "Evaluating Polyimides As Lightguide Materials", *Applied Optics*, vol. 27, No. 21, pp. 4565–4571. Nov. 1, 1988.

Chakravorty, et al., "High–Density Interconnection Using Photosensitive Polyimide And Electroplated Copper Conductor Lines", *IEEE, Transactions on Components, Hybrids and Manufacturing Technology*, vol. 13, No. 1, pp. 200–206. Mar. 1, 1990.

Jensen, et al., "Copper/Polyimide Materials System For High Performance Packaging" *IEEE, Transactions on Components, Hybrids and Manufacturing Technology*, vol. Chmt–7, No. 4, pp. 384–393. Dec. 1984.

(List continued on next page.)

*Primary Examiner*—Charles T. Jordan
*Assistant Examiner*—John R. Hardee
*Attorney, Agent, or Firm*—Mary Y. Redman

[57] ABSTRACT

A method for selectively altering the refractive index of selected portions of a polyimide material can be used to form a variety of optical components, such as waveguides that can be used as optical interconnections between elements in electronic or microelectronic circuits. The method includes the steps of introducing a dopant which is capable of altering the index of refraction of the film and which will be photoattached to the polyimide material after exposure to radiation, exposing selected portions of the material to radiation, removing at least some of the dopant from the non-irradiated portions of the material, and then exposing the non-irradiated portions of the material to radiation of a type and quantity sufficient to alter the index of refraction of the material.

10 Claims, 3 Drawing Sheets

OTHER PUBLICATIONS

J. Grinberg, et al., "A Cellular V1SI Architecture", *Computer, Jan.* 1984, pp. 69–81. Jan. 1984.

Hagge, J. K., "Ultra–Reliable Packaging For Silicon–On–Silicon WSI", *IEEE, Transactions on Components, Hybrids and Manufacturing Technology,* vol. 12, No. 2, pp. 170–179. Jun. 1989.

Scaiano, et al., "The Mechanism Of Photocure Of Inherently Photosensitive Polyimides Containing a Benzophenone Group", *Polymer Engrng And Science,* vol. 29, No. 14, pp. 942–944. Jul. 1989.

Franke, Applied Optics, vol. 23, No. 16, pp. 2729–2732, (1984).

Chakravorty, Applied Optics, vol. 32, No. 13, pp. 2331–2338, (1993).

METHOD FOR RECORDING REFRACTIVE INDEX PATTERNS IN POLYIMIDE FILMS

This application is a continuation of prior copending application Ser. No. 08/056,453, filed May 3, 1993, now abandoned.

The present invention relates to methods for creating refractive index variations in selected regions of a polyimide material to form waveguides or other optical components.

BACKGROUND OF THE INVENTION

The developing multichip module packaging technology promises higher connectivity, faster electrical performance, more efficient thermal management and better reliability than was possible with earlier approaches to electronics packaging. Polyimide, with its low dielectric constant and superior planarization characteristics, is playing a key role in the metal/polyimide hybrid wafer scale integration technology. Polyimides are typically used to provide a substrate for microelectronic elements in a multichip module. To achieve dense packing of microelectronic elements, the polyimide layers are usually designed to be planar and stackable.

Full utilization of this technology requires a comparable advance in the technology used to interconnect the microelectronic elements within the multichip module. Transmission of optical signals through optical waveguides is a possibility for such interconnections, but there have previously been significant obstacles to its utilization with multichip modules.

One obstacle has been the inability to obtain a difference between the indices of refraction of the waveguides and the surrounding medium large enough to prevent leakage of signals from the waveguides. Signal leakage is undesirable because of the potential for cross-talk between adjacent waveguides. Although the degree of cross-talk can be reduced by spacing the waveguides a sufficient distance apart, such a remedy is unsatisfactory where dense packing of components is desired. High waveguiding loss is a critical concern in multichip module applications, since interconnection lengths may exceed several centimeters.

Another obstacle has been the inability to form waveguides in polyimide that are sufficiently planar in vertical cross section so as not to interfere with the multilayer geometry of multichip module packaging. This packaging requires a planar structure so that multiple layers can be stacked on top of one another. Nonplanar ridge waveguides have been formed in polyimides, but they are not suitable for use in multichip module packaging.

A further obstacle has been inadequate thermal stability of waveguides when subjected to normal processing conditions. Since multichip module fabrication processes may involve temperatures exceeding 300° C., waveguide characteristics of optical interconnections must not be adversely affected by high temperatures.

What is needed is a technique for forming waveguides in polyimide that show low loss characteristics and have a sufficiently large refractive index difference between the waveguide and the surrounding material, that are substantially planar so as to be compatible with the geometry of multichip module packaging, and that have sufficient thermal stability to withstand the high temperature used in multichip module fabrication processes.

The method of the present invention can provide waveguides that meet these needs. The method is further advantageous in that it is versatile, being useful for forming a variety of optical components, such as gratings, microlenses, microprisms, or the like, by a process that is economical and adaptable for use in conjunction with other fabrication processes commonly used in integrated optics or microelectronics.

SUMMARY OF THE INVENTION

The invention provides a method for selectively altering the refractive index of selected portions of a polyimide material. It can be used to form a variety of optical components, such as gratings, microlenses, microprisms and the like, and waveguides that can be used as optical interconnections between elements in electronic or microelectronic circuits. Waveguides formed by the method of the present invention can serve as pathways for the transmission of information in the form of electromagnetic waves between electronic elements in a circuit.

Waveguides formed in a polyimide film in accordance with the present invention provide particular advantages when used to interconnect integrated circuits that are packaged in a multichip module, because of the low loss characteristics, good thermal stability, and planar profile of these waveguides.

In one aspect, the invention is a method for altering the refractive indices of selected portions of a polyimide material by introducing a dopant which is capable of altering the index of refraction of the film and which will be photoattached to the polyimide material after exposure to radiation, exposing selected portions of the material to radiation, removing at least some of the dopant from the non-irradiated portions of the material, and then exposing the non-irradiated portions of the material to radiation of a type and quantity sufficient to alter the index of refraction of the material.

In a preferred embodiment, a photomask would be used in exposing the selected portions of a polyimide film to radiation. The radiation would preferably be in the ultraviolet range of the spectrum. The dopant removing step would include baking the material at a temperature and for a duration sufficient to remove at least some, or preferably substantially all, of the dopant from the unexposed areas. The exposing of the non-irradiated portions of the material would preferably be accomplished by a flood exposure of the entire surface of the material.

The technique of the preferred embodiment is based in part on the properties of the photosensitizers that are used as a dopant in a preimidized photosensitive polyimide film. By an ultraviolet photo-assisted process, the dopant molecules are attached to the polyimide backbone upon irradiation. The presence of the dopant lowers the refractive index of the material. Dopant is then removed from the unexposed areas, and the refractive index difference is enhanced by flooding the entire film surface with ultraviolet light. This is believed to cause photocrosslinking in the now undoped areas, which enhances the refractive index difference.

BRIEF DESCRIPTION OF THE DRAWINGS

The foregoing aspects and many of the attendant advantages of this invention will become more readily apparent and better understood by reference to the following detailed description, when taken in conjunction with the accompanying drawings, wherein.

DETAILED DESCRIPTION OF THE PREFERRED EMBODIMENT

Although the invention is useful in making a variety of types of optical components, it will be discussed for purposes of illustration in the context of forming waveguides suitable for use for interconnection of integrated circuits that are packaged in a multichip module.

Figure 1:
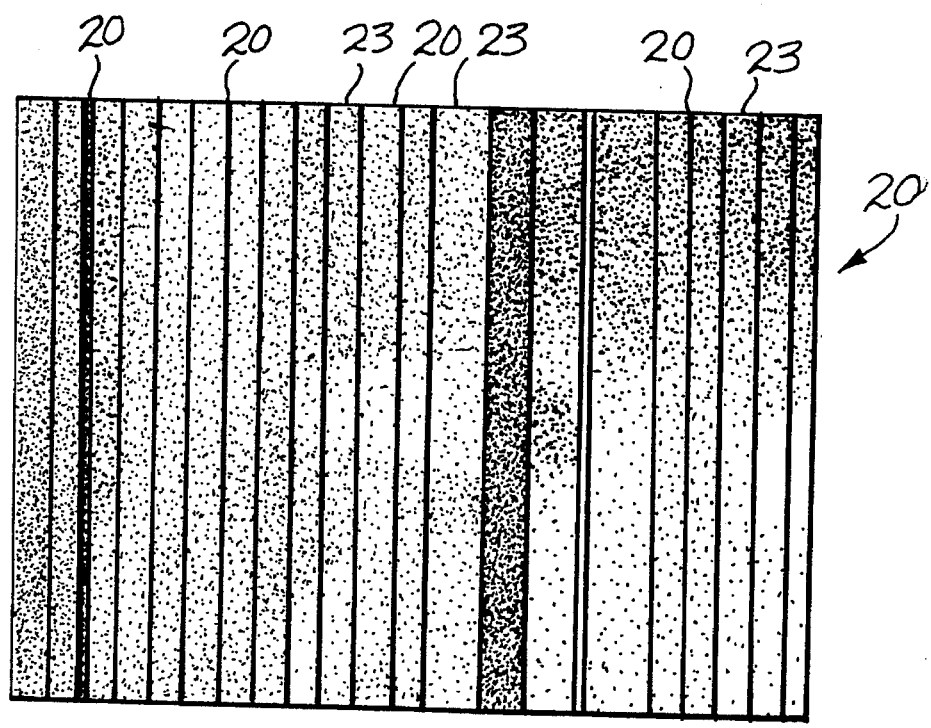
FIG. 1 shows a top view of waveguides formed in accordance with one embodiment of the present invention.

Referring to FIG. 1, waveguides 20 formed in accordance with the present invention are provided in a layer of a polyimide material 22. These waveguides 20 have a higher index of refraction than the surrounding material 23. These differing indices of refraction cause each waveguide 20 to internally reflect and transmit electromagnetic waves introduced into one end. The index of refraction difference between the waveguide 20 and surrounding material 23 is provided in a preferred embodiment by the method described below with reference to FIGS. 2A–D.

Figure 2A:
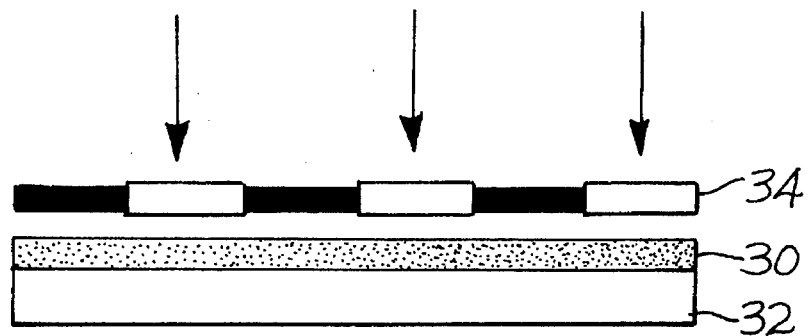
FIGS. 2A–2D are schematic illustrations of a sequence of steps in a preferred embodiment of the invention.

As shown in FIG. 2A, a polyimide surface layer 30 on a substrate 32 such as glass is doped with a photosensitizer. The photosensitizer dopant is of a type made up of molecules which will attach to polyimide chains upon exposure to radiation such as ultraviolet light.

Suitable polyimides for use in this technique include preimidized polyimides having a BTDA-alkylated diamine type of chemistry. The Probimide 400™ series commercially available from Ciba-Geigy, Inc. is a polyimide material that has been found to be advantageous for use in this method. An initial polyimide precursor solution will preferably contain 8% to 14% by weight of polyimide solid dissolved in a gamma-butyroactone solvent. The polyimide can be applied to a substrate to form a polyimide film by processes that are well known in the art such as spin coating.

Suitable photosensitizer dopants include benzildimethyl ketal and benzoin ethyl ether. An initial dopant concentration (where concentration is the weight of the dopant as a percentage of the combined weight of the polyimide precursor solution plus dopant) in the range of 10% to 20% has been found to be advantageous, as will be discussed more fully below. It can be added to the polyimide by techniques that are well known in the art.

A photomask 34 is prepared in a conventional manner and placed on or above the doped polyimide surface 30. The doped polyimide film surface 30 is then irradiated through the photomask 34 with light in the ultraviolet region of the spectrum. This results in selective irradiation of those portions of the polyimide where a decrease in refractive index is desired. Typically, light in a wavelength range of 254 to 365 nm, at an exposure dose of 1.5 to 5.0 joules/cm$^2$/micron of film thickness would be preferred. The choice of such parameters in any specific case would depend on the properties of the photosensitive dopant and the polyimide that are used.

Figure 2B:
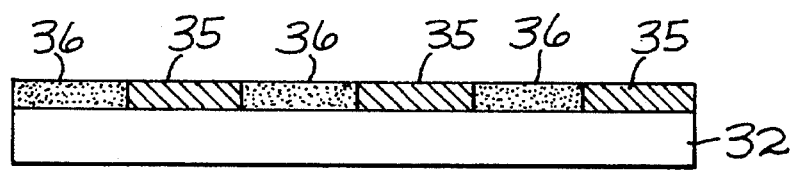

Referring to FIG. 2B, interaction between the incident light and the photosensitizer-doped polyimide results in photo attachment of the dopant to the polyimide molecule chains in the light-exposed regions 35. The presence of the dopant causes a decrease in refractive index in these regions 35.

Figure 3A:
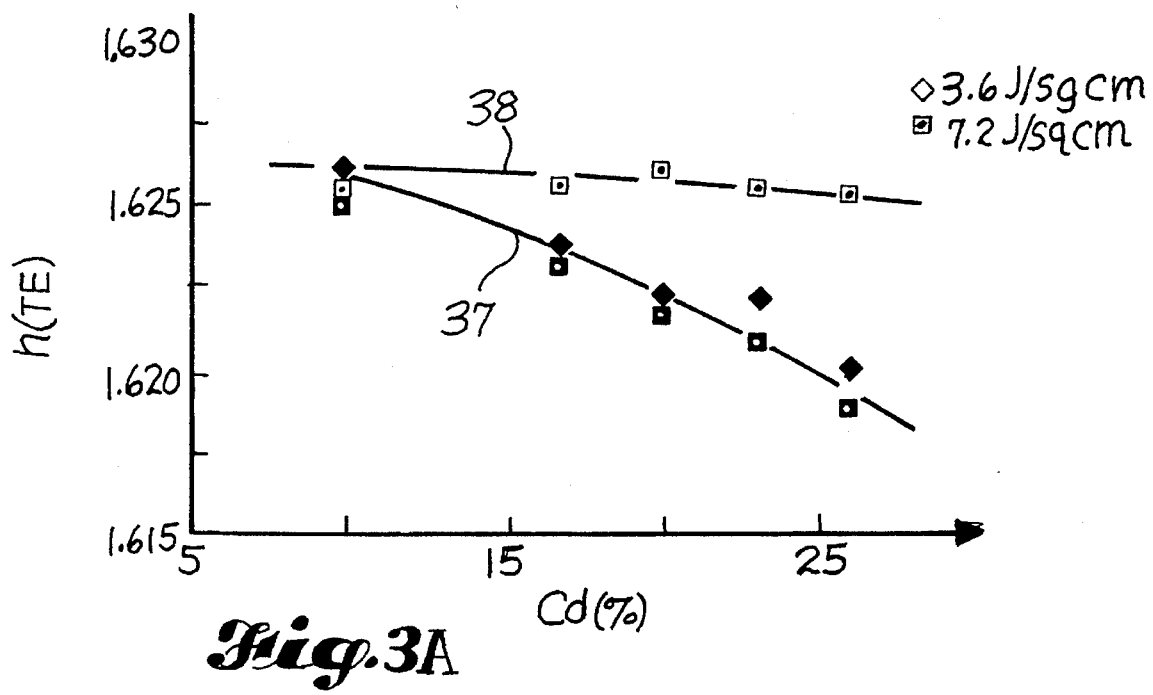
FIGS. 3A and 3B are graphs of index of refraction versus initial dopant concentration after the initial radiation exposure step of the process in a preferred embodiment.
Figure 3B:
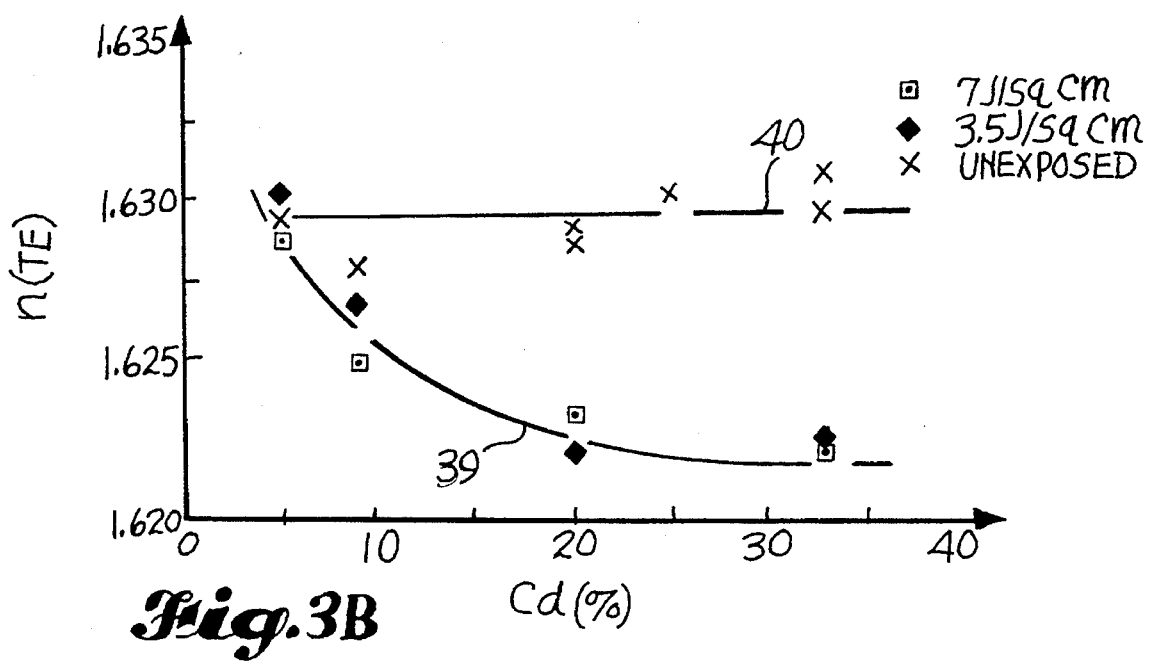

FIGS. 3A and 3B show examples of index of refraction for the TE mode (n(TE)) as a function of initial dopant concentration ($C_d$) in the polyimide solution that have been achieved at this point in the process. In FIG. 3A, curve 37 shows the index of refraction for an exposed region, (data points for two different ultraviolet radiation intensities are given); curve 38 shows data for the unexposed regions 36, with benzildimethyketal as the dopant. In similar fashion, curves 39 and 40 of FIG. 3B show indices of refraction for the exposed and unexposed regions, respectively, where benzoin ethyl ether was used as the dopant. These graphs show that appreciable refractive index differences on the order of 0.01 can be achieved through the selective irradiation of portions of the doped polyimide film, with initial dopant concentrations (in the polyimide solution) which are in a reasonable and practical range, such as 10% to 20%.

Figure 2C:
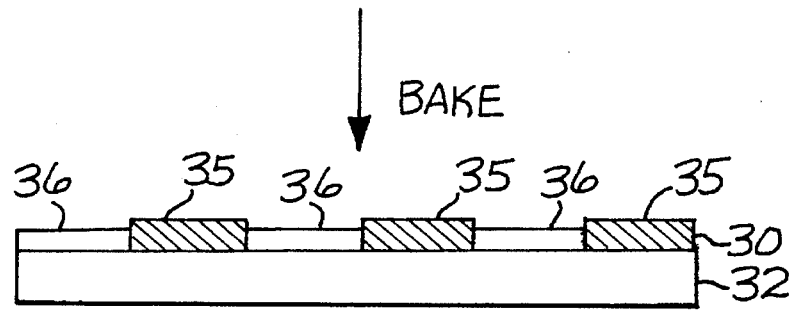

Referring now to FIG. 2C, the polyimide surface 30 and substrate 32 is next baked at temperature high enough and for a time interval long enough to remove dopant from the unexposed regions 36 of the surface 30. Dopant in the previously exposed regions 35 will be retained since the photosensitizer molecules there have attached to the polyimide chains. This results in an increased refractive index in the unexposed regions 36, which, in a preferred embodiment, are now substantially pure polyimide. The magnitude of the refractive index change depends on how much dopant is removed from the unexposed regions 36. The smaller the amount of dopant removed, the smaller the refractive index change. A bake at 150 degrees centigrade for about 3 hours would be typical, the choice of temperature and time for a particular case depending on the properties of the materials being used. Preferably, the baking would-be done in an ambient atmosphere of nitrogen or other gas which is suitable for avoiding oxidation of the polyimide.

Figure 2D:
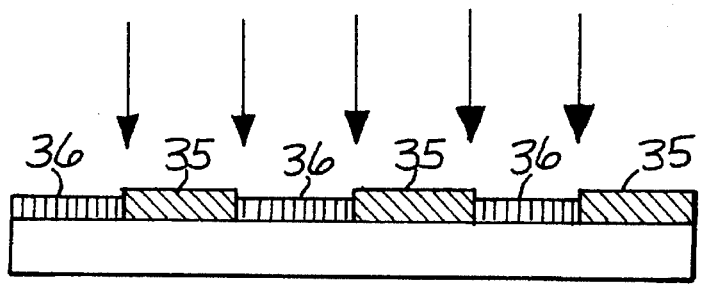

In a preferred embodiment, the previously unexposed regions 36 are then exposed to ultraviolet radiation, as shown in FIG. 2D to further increase the refractive index of these regions 36. This increase in refractive index is believed to be due to densification of the undoped regions 36 through ultraviolet assisted photocrosslinking. In a preferred embodiment this exposure can be accomplished by flooding the entire surface 30 with ultraviolet radiation, preferably at a dose of 6 joules/cm$^2$ or greater measured at 365 nm.

Figure 4:
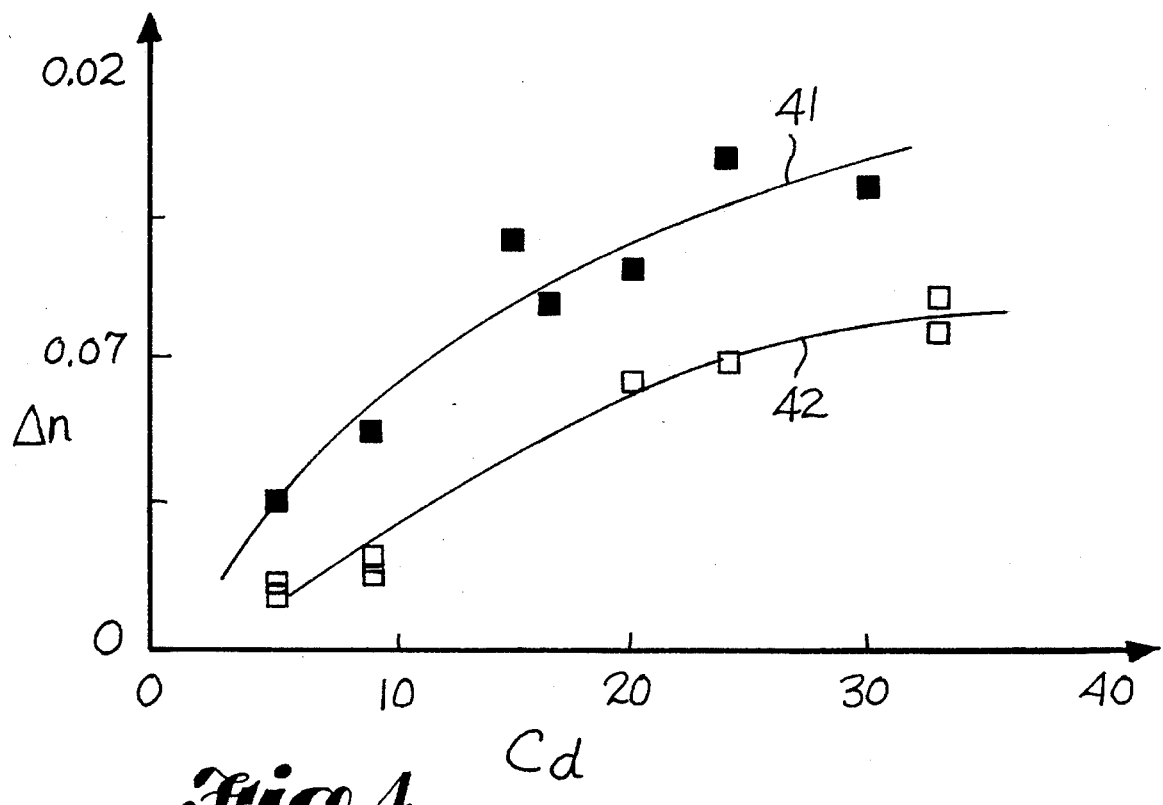
FIG. 4 is a graph of refractive index difference versus initial dopant concentration achieved through a preferred embodiment of the process described below.

FIG. 4 shows the refractive index difference ($\Delta$n) as a function of initial dopant concentration ($C_d$) for a polyimide film baked at up to 200 degrees centigrade for 30 minutes, and then flooded with ultraviolet radiation at an intensity of about 10 joules/sq. cm. Solutions of the polyimide available as Probimide 400™ from Ciba-Geigy, Inc. and the dopants benzoin ethyl ether and benzildimethyl ketal with dopant concentrations of 5% to 30% by weight in polyimide solution were spin coated on silicon wafers. The films were dried at 45° C. for 6 hours in a nitrogen ambient. The dried films were exposed to UV radiation through a photomask. The samples were then baked at temperatures of up to 200° C. in nitrogen ambient in a convection oven. A flood UV exposure was performed next on the baked samples.

Curve 41 shows the $\Delta$n achieved with benzildimethyketal as a dopant. Curve 42 shows the $\Delta$n with benzoin ethyl ether as a dopant. This graph shows that a significant $\Delta$n can be achieved with reasonable dopant concentrations when this process is used. A comparison of the information given in FIGS. 3 and 4 shows that the flood exposure may further increase the refractive index difference by 0.005 or more, depending on how the process is carried out.

While the present invention has been particularly described with respect to a preferred sequence of process steps, it will be understood that the invention is not limited to the particular process steps, their sequence, or the final structures depicted in the drawings. On the contrary, it is intended to cover all alternatives, modifications, and equivalents as may be included within the spirit and scope of the invention defined by the appended claims.

What is claimed is:

1. A method for creating a difference in refractive indices between selected regions of a polyimide material comprising the steps of:

introducing into the material a dopant which will alter the index of refraction of the material;

exposing selected regions of the material to radiation in a first preselected spectral range, whereby the material will include first regions which have been exposed to radiation and second regions which have not been exposed to radiation;

removing at least some of the dopant from the second regions; and exposing the second regions to radiation in a second preselected spectral range selected so as to increase the index of refraction of said second regions.

2. The method of claim 1 wherein the dopant removing step includes the step of baking the material at a temperature and for a duration sufficient to remove at least some of the dopant from the second regions.

3. The method of claim 2 wherein the dopant removing step includes the step of baking the material at a temperature and for a duration sufficient to remove substantially all of the dopant from the second regions.

4. The method of claim 2 wherein the step of exposing the second regions includes the step of exposing the entire material to radiation.

5. The method of claim 4 wherein the first spectral range includes wavelengths in the ultraviolet region of the spectrum.

6. The method of claim 5 wherein the second spectral range includes wavelengths in the ultraviolet region of the spectrum.

7. The method of claim 4 wherein the step of exposing selected regions of the material includes the step of exposing selected areas through a photomask.

8. A method for providing a waveguide for guiding electromagnetic waves in a polyimide material comprising the steps of:

introducing into the material a dopant which will decrease the index of refraction of the material upon exposure to radiation;

exposing selected portions of the material to radiation;

removing the dopant from those portions of the material which were not exposed to radiation; and exposing the portions of the material which were not exposed to radiation to radiation of a type and quantity sufficient to increase the index of refraction of the material.

9. A waveguide in a polyimide material prepared in accordance with the method of claim 8.

10. A waveguide in a polyimide material prepared in accordance with the method of claim 1.

* * * * *